United States Patent [19]

Spaeth

[11] Patent Number: 5,058,346

[45] Date of Patent: Oct. 22, 1991

[54] FIRE PROTECTION COLLAR

[76] Inventor: Michael M. Spaeth, Lindwurmstrasse 10/VII, D-8000 Munich 2, Fed. Rep. of Germany

[21] Appl. No.: 373,221

[22] Filed: Jun. 29, 1989

[30] Foreign Application Priority Data

Jun. 29, 1988 [DE] Fed. Rep. of Germany ....... 3821969

[51] Int. Cl.$^5$ .............................................. E04B 1/94
[52] U.S. Cl. ....................................... 52/317; 52/220; 52/221
[58] Field of Search ................... 52/220, 221, 232, 317

[56] References Cited

U.S. PATENT DOCUMENTS

| | | | |
|---|---|---|---|
| 4,221,029 | 9/1980 | Johnson | 52/232 |
| 4,363,199 | 12/1982 | Kucheria et al. | 52/221 |
| 4,538,389 | 9/1985 | Heinen | 52/232 X |
| 4,669,244 | 6/1987 | Szoke | 52/220 |
| 4,669,759 | 6/1987 | Harbeke | 52/220 X |
| 4,796,401 | 1/1989 | Wexler | 52/232 X |

*Primary Examiner*—Richard E. Chilcot, Jr.
*Assistant Examiner*—Linda Watson
*Attorney, Agent, or Firm*—Marks Murase & White

[57] ABSTRACT

A fire protection collar for one or more conduits penetrating through openings in fireproof partitions such as walls or ceilings. The fire protection collar includes at least two stable, smoke tight, fireproof coverings of a thermally insulating material sealing the space between the outer surfaces of the partition and the exterior surface of the conduit. A filling of either a plurality of sheets or particles of expanded material, with a thermal conductivity of the same order of magnitude as concrete, essentially fills up the space between the coverings, the conduit and the partition. When the fire protection collar is used for heatproof conduits, the filling is in contact with the exterior surface of the conduit. However, when the fire protection collar is used for conduits which are not heatproof, i.e., may be altered or may even collapse in the event of fire, a jacketing concentrically surrounds the conduit between the coverings with an intermediate layer of expandable material situated between the jacketing and the covering, with the filling essentially filling up the space between said jacketing and said coverings. In the event of fire, the expandable material expands and the forces arising therefrom are directed toward the conduit to pinch off the conduit.

13 Claims, 2 Drawing Sheets

FIRE PROTECTION COLLAR

Fire prevention in buildings, especially in large industrial buildings, office buildings, schools, or hospitals, presents a problem in that ceilings or walls that are classified as fireproof, are penetrated by conduits that often function as fire conductors.

These conduits may be of various types of supply and return conduits, such as fresh water and drain pipes, compressed air pipes, industrial gasses, exhaust gasses, or even electrical conduits. All of these types of conduits pass through fireproof ceilings or walls through openings provided for this purpose. However, in order to install the conduits, these openings must in principle be considerably larger than the diameter of the conduit or bundle of conduits. This leaves gaps between the conduit and the wall or ceiling, respectively, after installation of the conduit, through which gaps a fire can spread, thus subverting the function of the wall or ceiling as a fire block.

In order to prevent this, the gaps left in the openings between conduits and wall or ceiling, respectively, are, for example, filled with a very high, thermally insulating material, such as mineral wool or the like. This inhibits somewhat the spread of a fire through such holes left in otherwise fireproof ceilings or walls.

However, this does not prevent the spread of fire along such conduits through a ceiling or wall, since the fire need not spread directly through gaps in the wall or ceiling; rather, the conduit may be heated on the fire side to such an extent that objects on the other side of the wall, and thus partitioned off from the fire, may exceed their carbonization or ignition temperature and begin to smolder or ignite due to the thermal conductivity of the conduit. This is especially common with floor coverings such as carpets and the like that directly or indirectly come in contact with the conduit on the side away from the fire. This process occurs especially when the wall of the conduit is composed of a material with good thermal conductivity, which is in principle the case with all conduits made of metal, such as gas lines, etc.

Thermal transmission of this type through the partitioning wall or ceiling via the walls of the conduit can only be avoided if heat is rapidly conducted away from the wall of the conduit into the material of the wall or ceiling in the wall or ceiling region, so that the wall of the conduit no longer reaches the carbonization or ignition temperature of the adjacent material on the side away from the fire. Attempts to accomplish this have hitherto included filling up the gap left after installation between the conduit and the wall or ceiling with a fireproof, concrete-like mortar. However, not only does this result in disadvantages with regard to structural acoustics, but, with metal conduits for example, to a great extent promotes crevice corrosion at the surfaces where the conduit wall contacts the introduced mortar. In addition, in the event of a fire, deformation of the conduit wall can occur due to the divergent expansion characteristics of the conduit material and the mortar, which often affects the integrity of the conduit. This can have disastrous consequences as a fire progresses, especially for conduits with combustible contents.

The object of the invention is therefore to devise a seal for the gaps left after conduits have been passed through ceilings or walls, with the seal to be impenetrable to fire and smoke, fireproof, and thermally ablative, and neither under normal conditions nor in the event of a fire to lead one to expect unintentional damage to the conduits.

This object is achieved in that the hollow spaces left in ceilings or walls for the passage of conduits is filled, after installation of the conduits, with an expanded material having very high thermal conductivity, such as, for example, expanded metal, in such a way that the filling makes as good a contact as possible with the wall of the conduit, on the one hand, and the surrounding material of the wall or ceiling, on the other, in order to facilitate the ablation of heat from the surface of the heated conduit to the wall or ceiling. It is preferable that any remaining gaps be filled through the entire thickness of the ceiling or wall. The thermal conductivity of the expanded material will, thus, be adequate if it is of the same order of magnitude as the thermal conductivity of the conventional building materials for the ceilings and walls, for example, concrete.

The expanded material used for this purpose, which is specially referred to below as expanded metal, can be in the form of a multiplicity of essentially mutually parallel sheets of expanded metal, or in the form of approximately spherical filling particles that are likewise formed of expanded metal.

An advantage using spherical filling particles of this type is the greater simplicity with which they can be applied, since, e.g., when filling the space left around a conduit that passes through a ceiling, these filling particles can simply be poured into the hollow space left above a lower covering that is aligned with the bottom surface of the ceiling and extends tightly around the conduit, whereupon the filling particles can be compressed slightly in order to effect as good a contact as possible between the filling particles and the conduit and between the filling particles and the surrounding ceiling material. This does not lead to destruction of the structure of the expanded metal due to the inherent elasticity of the filling particles. Such light compression of the filling within the existing hollow spaces can improve the contact between the filling particles and the conduit, on the one hand, and between the filling particles and the surrounding ceiling or wall, on the other. Thus, the light compression exerts a positive effect on the thermal ablation capacity of the filling.

Obviously, not only must the two coverings on either side of the collar, which are oriented parallel to each other and are substantially aligned with the two surfaces of the wall or ceiling that is penetrated, have adequate static stability, since, for example, the upper covering of a ceiling under certain circumstances must be able to bear the load of stored objects, but must also have adequate thermal stability, since the entire effect of the collar can be lost if this covering is destroyed in the event of a fire.

At the same time, these coverings should be thermally insulated from the filling so that heat will be ablated from the conduit to the material of the ceiling or wall, respectively, preferably via the filling and only to the least possible degree via the coverings themselves. In the ideal case, therefore, each of the coverings would also have to be insulated from the conduit itself, so that the covering itself should not extend all the way to the conduit; rather, an insulating layer should disposed between covering and conduit. Likewise an insulating layer of mineral fibers is recommended.

Furthermore, a distinction in principle must be drawn between two different applications, depending on the type and material of the conduit or conduits to be surrounded. The procedure heretofore described is to be followed when protection is to be afforded the passage of conduits wherein at least the wall of the conduit is composed predominantly of fireproof material. This is the primary procedure, for example, for most conduits with metallic walls. These conduits expand somewhat when exposed to heat, but essentially maintain their shape, so as not to result in the appearance of gaps between the conduit and the surrounding ceiling or wall.

The conduit can also be composed of a non-heatproof material, as for example, drain pipes made of PVC and the like. To be sure, such materials will not themselves inevitably begin to burn in the event of a fire, but when exposed to enough heat, such a pipe will begin to melt and thus collapse, leaving, in the event of a fire, a passage in the ceiling or wall, respectively, which can nullify the partitioning effect of this wall or ceiling. If a vertical conduit through a ceiling is involved, and is surrounded, not by sheets of expanded material but by spherical filling particles, the may fall particles falling down from above to the middle of the PVC pipe to close off this passageway. However, this cannot be viewed as a sufficiently reliable method of preventing the progress of a fire.

Rather, it is recommended, in the case of insufficient heatproof and additionally hollow conduits, that these conduits be surrounded by a fireproof jacketing in the region where the ceiling or wall, respectively, is penetrated. In such a situation, an intermediate layer must be disposed between the jacketing and the conduit itself. The intermediate layer consists of a material that swells strongly under the influence of heat. As a result of the swelling of the material, such per se known jacketings develop a very strong force directed toward the center of the jacketing. Since this type of jacketing is stable enough, the pressure is not directed outward in the form of mechanical deformation. In the event of a fire, this actually pinches off the jacketed conduit so that the passageway that would otherwise appear through the ceiling or wall, respectively, is sealed off within a short period of time. Since the material does react once exposed to heat, but cannot necessarily withstand even higher temperatures for a long time, it is recommended that the jacketing of the conduit to be protected not be implemented through the entire width of the penetrated wall or ceiling. Hence, at least not all the way from one covering to the opposite covering, but only in the central region, so as to permit the placement of an additional filling of expanded metal, whether in the form of sheets or in the form of round filling particles, between the jacketing and the two coverings. The additional filling also protects the material of the intermediate layer from the direct heat of the fire after the latter swells.

Two exemplary embodiments of the invention are explained below in greater detail with reference to the drawing.

Figure 1:
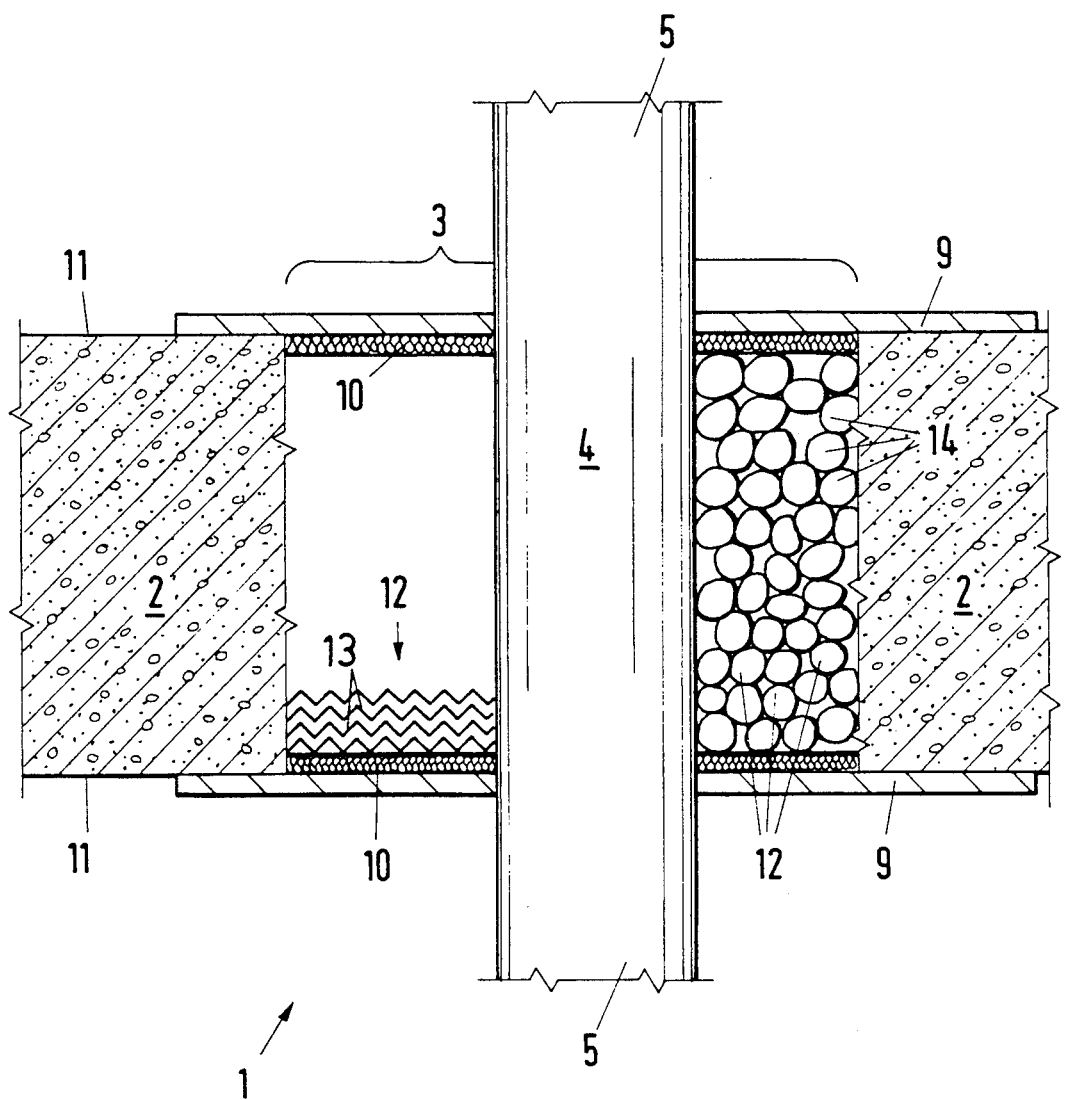
FIG. 1 shows a heatproof conduit that passes through a ceiling.

FIG. 1 shows a section through a ceiling 2 having an upper and lower surface 11, in which ceiling an opening 3 has been left, with the approximately vertical conduit 4 extending through the opening. This conduit 4 essentially comprises a wall 5 of heatproof material that would retain its shape at least for a sufficiently long period of time in the event of a fire. In the case of a conduit 4 thus devised, it is primarily necessary to prevent the wall 5, which is indeed heatproof but mostly also a good conductor of heat, from conducting the heat of the fire from one side of the ceiling 2 to the other where floor coverings, suspended ceilings, or the like can smolder or burn. To this end—in the case of a horizontal ceiling as shown in FIG. 1—a lower covering 9 is first mounted to the lower surface 11 of the ceiling 2 by fastenings (not shown) in such a way that it is aligned with the lower surface 11 of the ceiling 2. this covering 9 can be embodied as a single piece that can be slid over conduit 4 along a radial incision for installation, or multi-part coverings 9 can be used. These coverings 9 should preferably not come into direct contact with the conduit 4. Otherwise, in the event of a fire, they themselves would become strongly heated via the wall 5 of the conduit 4 itself, which is not always desirable from the perspective of fire protection technology due to the possible existence of adjacent objects, even though this type of covering 9 can also ablate heat to the material of the ceiling 2 through direct contact with the wall 5. Independently of this, it is possible, as in the case shown in FIG. 1, to have an insulating layer 10 applied to the covering 9. The insulating layer also being interposed between the face of the covering 9 and the conduit 4 and lying against the conduit 4. Obviously, such an insulating layer 10 can be affixed to the covering 9 prior to installation. The covering 9 itself can, e.g., be screwed to the ceiling by means of simple screws and perhaps anchors, or inside the opening 3 by means of mounting brackets or similar devices of appropriate configuration. Furthermore, any other suitable manner of fastening can be selected.

A filling 12, composed of a heatproof and thermally conductive expanded material, preferably expanded metal, is inserted into the hollow space that now exists above the lower covering 9 and that extends vertically through ceiling 2. The expanded metal can be inserted either in the form of, e.g., sheets 13 that essentially lie parallel to and in contact with each other, several of which are indicated on the left side of FIG. 1, or the expanded metal can be inserted in the form of approximately spherical filling particles 14. These filling particles 14 have the advantage that they can be poured or blown loosely into existing hollow spaces and then subsequently lightly compressed, which also makes it possible to fill up hollow spaces, such as concave pockets in the face of ceiling 2 and the like that may not necessarily be visible or accessible when filling from above. This insures that the filling particles 14 make sufficient contact, over a large surface area, with each other, with the wall 5 of conduit 4, and with the faces of ceiling 2. After inserting this filling 12, the opening 3 is sealed in turn with a covering 9 whose structure and form essentially match those of the lower covering 9, including the insulating layer 10 as well.

Figure 2:
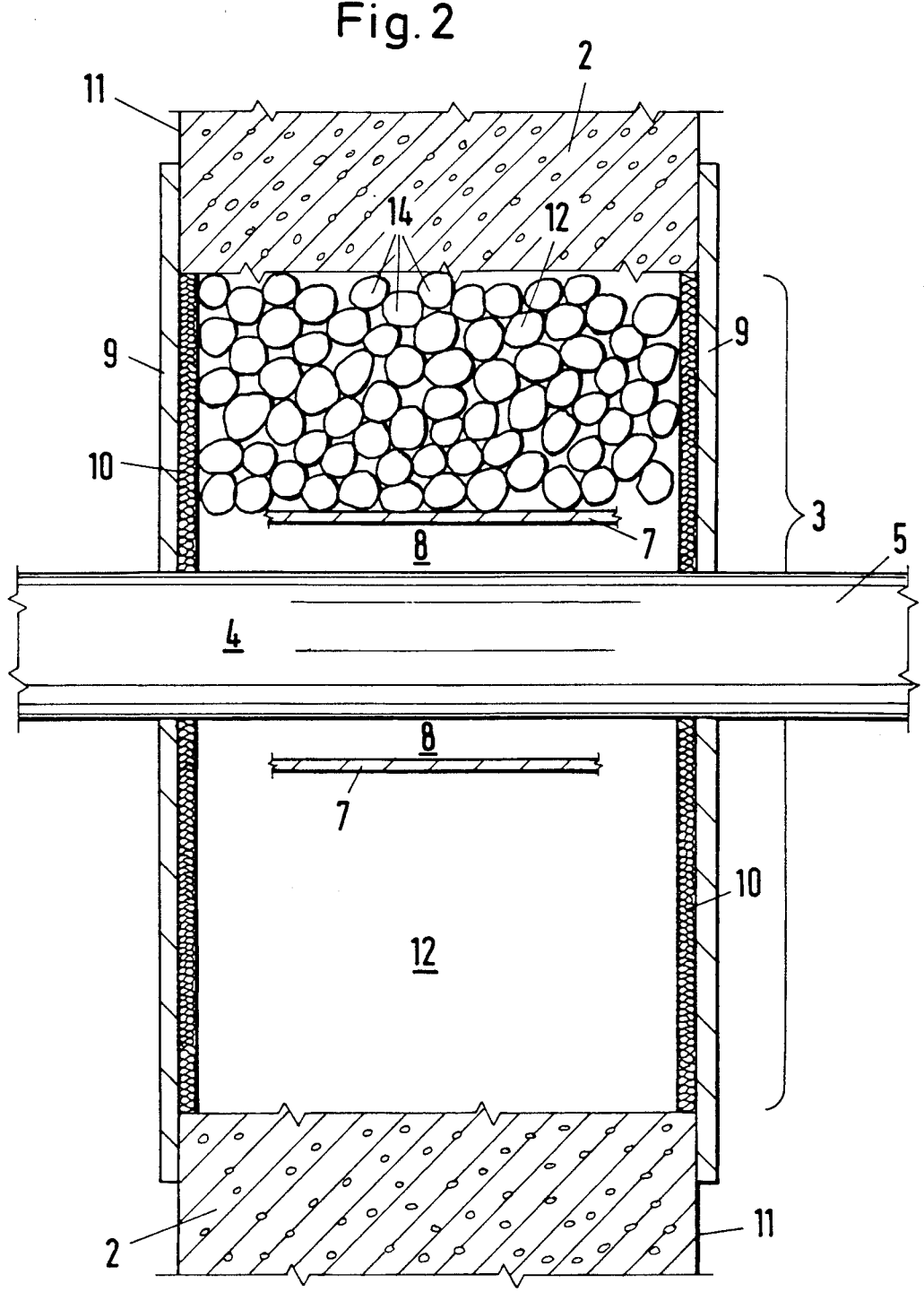
FIG. 2 shows a conduit of a non-heatproof material passing through a wall.

If, on the other hand, the conduit 4 involved is not of a heatproof material, but one whose shape would be altered or that would even completely collapse in on itself in the event of a fire, then a fire protection collar corresponding to FIG. 2, shown here for a passage of a conduit 4 through a vertical wall 2, is to be constructed.

This construction differs from the construction in FIG. 1 only in that the filling 12, hence the filling particles 14 or the sheets 13 of expanded metal, (sheets not shown in FIG. 2), no longer directly contact the wall 5 of conduit 4, at least in the central region between the two coverings 9. Since this wall 5 in this region is concentrically surrounded by a jacketing 7, with an intermediate layer 8 of a known material located between this jacketing 7 and the wall 5, the intermediate layer material being one that swells up very strongly in the event of a fire, hence when exposed to sufficient heat. This essentially known jacketing 7 along with the intermediate layer 8 has the effect that, due to the stability of the jacketing 7, the forces arising when intermediate layer 8 swells up are directed exclusively toward the center of the jacketing and thus toward the center of the conduit 4. Under such circumstances, the conduit 4 is completely and tightly pinched off by the swelling of intermediate layer 8. This prevents an open passageway, through which the fire might be able to spread, from arising at the site of conduit 4 in the event of a fire.

In order to prevent this jacketing 7 of the wall 5 of conduit 4 from being exposed to direct heat in the event of a fire after the intermediate layer 8 reacts, this jacketing 7 and the intermediate layer 8 are located only in the central region between the two coverings 9, so that the filling 12 is still located in the axially intermediate space along conduit 4 between the coverings 9 and the jacketing 7 with the intermediate layer 8. The filling not only ablates the heat from the wall 5 of conduit 4 to the material of wall 2, but also heat from the jacketing 7 to the wall 2.

In this manner, depending on the specifications and condition of conduit 4, so much heat is ablated in the region of the wall or ceiling, respectively, 2, from the conduit 4 to the material of the wall or ceiling, respectively, 2, in the event of a fire that the side of conduit 4 away from the fire does not attain such a high temperature that surrounding materials are able to smolder or ignite, at least for a fairly long time.

Although the two coverings 9 in the cases presented in FIGS. 1 and 2 are not only parallel but aligned with and flush with the two surfaces 11 of the wall or ceiling, respectively, 2, these two coverings 9 can also run at a distance from the wall or ceiling, respectively, 2, parallel to its surfaces 11. In this way, the distance between the coverings 9 is greater than the thickness of the wall 2, as long as an appropriate shoulder or the like on the coverings 9 permits them to lie sufficiently against the wall or ceiling, respectively, 2, that the filling 12 in the form of sheets 13 or filling particles 14 cannot be lost through any gaps present herein.

Likewise, the distance between the coverings 9 can be less than the thickness of the wall or ceiling, respectively, 2, measured axially in the direction of conduit 4. In general, however, one will generally strive to place the filling 12 so that it contacts as large an area of the wall or ceiling, respectively, 2, as possible, so that a distance between the two coverings 9 at least as great as the thickness of the wall or ceiling, respectively, 2, will be selected. A distance between the two coverings 9 even greater than this is only recommended when, e.g., the thermal conductivity of filling 12 is less than that of the material in the surrounding wall or ceiling, respectively, 2, since the filling 12 material should then contact the surface of conduit 4 over a length measured axially along conduit 4 that is wider than the width of the ceiling or wall, 2, respectively, in order to transmit the heat from the conduit 4 to the surrounding wall or ceiling 2.

I claim:

1. A fire control collar for conduits penetrating through openings in fireproof partitions such as walls or ceilings, comprising:
    at least two stable, smoke tight, fireproof coverings of a thermally insulating material;
    said coverings sealing a space between outer surfaces of the partition and an exterior surface of the conduit; and
    a filling of expanded material being able to conduct heat away from the conduit, said filling essentially filling up the space between said coverings.

2. The fire control collar defined in claim 1, wherein said filling is in contact with said exterior surface of said conduit.

3. The fire control collar defined in claim 2, wherein said filling includes a plurality of particles of expanded material essentially spherical in shape.

4. A fire control collar for conduits penetrating through openings in fireproof partitions such as walls or ceilings, comprising:
    at least two stable, smoke tight, fireproof coverings of a thermally insulating material;
    said coverings sealing a space between outer surfaces of the partition and an exterior surface of the conduit; and
    a filling of expanded material being able to conduct heat away from the conduit, said filling including a plurality of individual sheets of expanded material essentially parallel to and in contact with one another, and said filling essentially filling up the space between said coverings and being in contact with said exterior surface of said conduit.

5. The fire control collar defined in claim 4, further comprising an insulating layer of material disposed between said coverings and said filling.

6. The fire control collar defined in claim 4, wherein said filling includes a heatproof and thermally conductive material.

7. The fire control collar defined in claim 4, further comprising a jacketing concentrically surrounding said conduit between said coverings and further comprising an intermediate layer of expandable material situated between said jacketing and said conduit, whereby in the event of fire, said expandable material expands and the forces arising therefrom are directed toward said conduit to pinch off said conduit.

8. The fire control collar defined in claim 7, wherein said jacketing and intermediate layer are located along a central region of said conduit between said coverings to prevent said jacketing from being exposed directly to heat in the event of fire.

9. A fire control collar for conduits penetrating through openings in fireproof partitions such as walls or ceilings, wherein the shape of the conduits may be altered or may even collapse in the event of fire, comprising:
    at least two stable, smoke tight, fireproof coverings of a thermally insulating material, said coverings sealing a space between outer surfaces of the partition and an exterior surface of the conduit;
    a jacketing concentrically surrounding said conduit between said coverings;
    a filling of expanded material being able to conduct heat away from the conduit, said filling essentially filling up the space between said jacketing and said coverings; and
    an intermediate layer of expandable material situated between said jacketing and the exterior surface of said conduit, whereby in the event of fire, said expandable material expands and the forces arising therefrom are directed toward said conduit to pinch off said conduit.

10. The fire control collar defined in claim 9, wherein said jacketing and intermediate layer are located along a central region of said conduit between said coverings to prevent said jacketing from being exposed directly to heat in the event of fire.

11. A fire control collar for conduits penetrating through openings in fireproof partitions such as walls or ceilings, wherein the shape of the conduits may be altered or may even collapse in the event of fire, comprising:

at least two stable, smoke tight, fireproof coverings of a thermally insulating material, said coverings sealing a space between outer surfaces of the partition and an exterior surface of the conduit;

a jacketing concentrically surrounding said conduit between said coverings;

a filling of expanded material being able to conduct heat away from the conduit, said filling essentially filling up the space between said jacketing and said coverings;

an intermediate layer of expandable material situated between said jacketing and the exterior surface of said conduit, whereby in the event of fire, said expandable material expands and the forces arising therefrom are directed toward said conduit to pinch off said conduit;

said jacketing and said intermediate layer being located along a central region of said conduit between said coverings to prevent said jacketing from being exposed directly to heat in the event of fire; and an insulating layer of material disposed between said coverings and said filling.

12. The fire control collar defined in claim 11, wherein said insulating layer includes mineral wool.

13. The fire control collar defined in claim 11, wherein said filling includes a plurality of particles of expanded material essentially spherical in shape.

* * * * *